United States Patent
Guo

(10) Patent No.: US 11,934,336 B2
(45) Date of Patent: Mar. 19, 2024

(54) PSEUDO ASYNCHRONOUS MULTI-PLANE INDEPENDENT READ

(71) Applicant: Yangtze Memory Technologies Co., Ltd., Hubei (CN)

(72) Inventor: Xiaojiang Guo, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 17/121,270

(22) Filed: Dec. 14, 2020

(65) Prior Publication Data
US 2022/0147480 A1 May 12, 2022

Related U.S. Application Data

(63) Continuation of application No. PCT/CN2020/126971, filed on Nov. 6, 2020.

(51) Int. Cl.
*G06F 13/42* (2006.01)
*G06F 12/02* (2006.01)
(Continued)

(52) U.S. Cl.
CPC ...... *G06F 13/4239* (2013.01); *G06F 12/0246* (2013.01); *G06F 13/1615* (2013.01); *G06F 13/4068* (2013.01)

(58) Field of Classification Search
CPC ............. G06F 12/0246; G06F 13/1615; G06F 13/4068; G06F 13/4239
See application file for complete search history.

(56) References Cited

U.S. PATENT DOCUMENTS

| | | | |
|---|---|---|---|
| 6,542,987 B1 * | 4/2003 | Fischer | G06F 9/384 714/21 |
| 2018/0039447 A1 * | 2/2018 | Lee | G06F 11/1064 |

(Continued)

FOREIGN PATENT DOCUMENTS

| | | |
|---|---|---|
| JP | 2010-509649 | 3/2010 |
| JP | 2020-016954 | 1/2020 |

OTHER PUBLICATIONS

International Search Report dated Jul. 26, 2021 in PCT/CN2020/126971, 4 pages.

(Continued)

*Primary Examiner* — Eric T Oberly
(74) *Attorney, Agent, or Firm* — Oblon, McClelland, Maier & Neustadt, L.L.P.

(57) ABSTRACT

Aspects of the disclosure provide an interface between a host and a multi-plane flash memory. For example, the interface can include a first storage unit, a second storage unit and a controller. The first storage unit can be configured to receive and store a first plane pipeline command issued from the host, and output the first plane pipeline command to a first plane of the flash memory. The second storage unit can be configured to receive and store a second plane pipeline command issued from the host, and output the second plane pipeline command to a second plane of the flash memory. The controller can be electrically connected to the first storage unit and the second storage unit, and configured to output the first and second plane pipeline commands to the first and second planes, respectively, when no read process is performed on the first plane and the second plane.

20 Claims, 7 Drawing Sheets

(51) Int. Cl.
    *G06F 13/16*     (2006.01)
    *G06F 13/40*     (2006.01)

(56) References Cited

U.S. PATENT DOCUMENTS

| | | | |
|---|---|---|---|
| 2019/0227749 A1* | 7/2019 | Wakchaure | G06F 3/0659 |
| 2019/0286586 A1* | 9/2019 | Minopoli | G06F 13/1689 |
| 2020/0026466 A1* | 1/2020 | Takano | G06F 3/061 |
| 2020/0042225 A1 | 2/2020 | Oh et al. | |
| 2020/0090754 A1* | 3/2020 | Asaoka | G11C 16/08 |
| 2020/0183608 A1 | 6/2020 | Byun | |
| 2020/0202934 A1* | 6/2020 | Imamoto | G11C 16/3459 |
| 2020/0310643 A1 | 10/2020 | Li et al. | |
| 2022/0043588 A1* | 2/2022 | Huang | G06F 3/0617 |
| 2022/0083266 A1* | 3/2022 | Prakash | G06F 3/0604 |

OTHER PUBLICATIONS

Office Action dated Nov. 28, 2023, in Corresponding Patent Application No. JP 2022-578922 with Machine Translation, 6 pages.

* cited by examiner

«PSEUDO ASYNCHRONOUS MULTI-PLANE INDEPENDENT READ»

RELATED APPLICATION

The present application is a bypass continuation of International Application No. PCT/CN2020/126971, filed on Nov. 6, 2020. The entire disclosure of the prior application is hereby incorporated by reference in its entirety.

TECHNICAL FIELD

The present application describes embodiments generally related to semiconductor memory devices.

BACKGROUND

Semiconductor memory devices can be categorized into volatile memory devices and non-volatile memory devices. Generally, volatile memory devices lose data when power is off, while non-volatile memory devices can retain stored data even when power is disconnected. In order to achieve higher data storage density, semiconductor manufactures developed vertical device technologies, such as three dimensional (3D) NAND flash memory technology, and the like. Such 3D NAND flash memory is a kind of non-volatile memory device. A multi-plane NAND flash memory can have multiple planes, which can be read synchronously or asynchronously.

SUMMARY

Aspects of the disclosure provide an interface, which can be disposed between a host and a multi-plane flash memory or installed in the flash memory. For example, the interface can include a first storage unit, a second storage unit and a controller. The first storage unit can be configured to receive and store a first plane pipeline command issued from the host, and output the first plane pipeline command to a first plane of the flash memory. The second storage unit can be configured to receive and store a second plane pipeline command issued from the host, and output the second plane pipeline command to a second plane of the flash memory. The controller can be electrically connected to the first storage unit and the second storage unit, and configured to output the first plane pipeline command to the first plane and the second plane pipeline command to the second plane when no read process is performed on the first plane and the second plane of the flash memory. For example, the first storage unit and the second storage unit can constitute a single memory.

In some embodiments, the first plane pipeline command can include a first plane pipeline read command and a first plane pipeline read end command. For example, the first storage unit can be configured to store either the first plane pipeline read command or the first plane pipeline read end command at a time. For another example, the first storage unit is configured to store only one of the first plane pipeline read command at a time.

In other embodiments, the controller can include a first switch. The first switch can have one end electrically connected to the first storage unit and the other end electrically connected to the host for receiving the first plane pipeline command. In other embodiments, the first switch can be configured to be close after the first storage unit is empty.

The first storage unit can be a queue. In other embodiments, the flash memory can be a NAND flash memory. In various embodiments, the flash memory can perform read processes on the first plane and the second plane synchronously. In some other embodiments, the host can issue the first plane pipeline command and the second plane pipeline command asynchronously.

Aspects of the disclosure also provide a method for outputting commands issued from a host to a multi-plane flash memory. For example, the method can include storing a first plane pipeline command and a second plane pipeline command that are issued from the host in a first storage unit and a second storage unit, respectively. The method can further include outputting the first plane pipeline command and the second plane pipeline command to a first plane and a second plane of the flash memory, respectively, when no read process is performed on the first plane and the second plane of the flash memory. In some embodiments, the first plane pipeline command is stored in the first storage unit after the first storage unit is empty.

BRIEF DESCRIPTION OF THE DRAWINGS

Exemplary embodiments of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
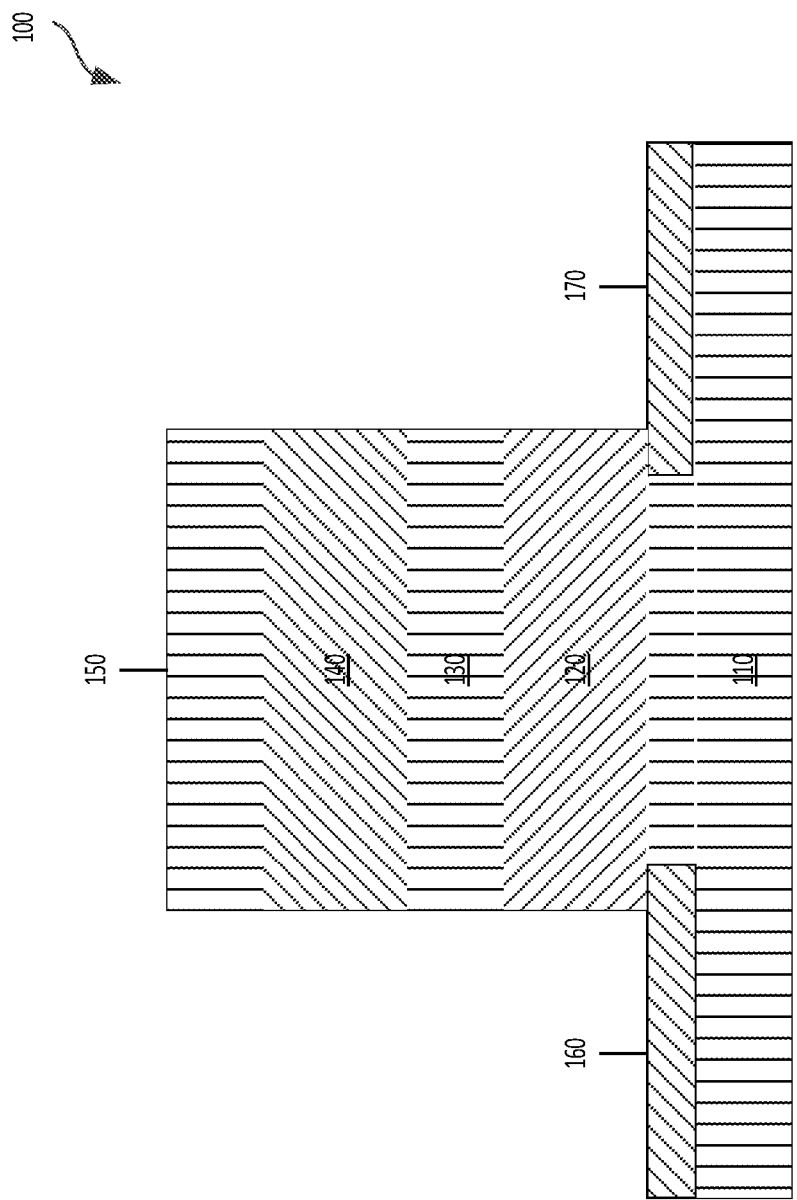
FIG. 1 shows an exemplary NAND flash memory cell according to some embodiments of the disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A pseudo asynchronous multi-plane independent (PAMPI) read scheme can be proposed according to some embodiments of the disclosure. In the pseudo asynchronous multi-plane independent read scheme, first and second plane pipeline commands, which can be issued by a host synchronously or asynchronously, can be performed on first and second planes of a multi-plane flash memory synchronously. An interface can be proposed to implement the pseudo asynchronous multi-plane read process according to some embodiments of the disclosure. For example, the interface can be disposed between the host and the multi-plane flash memory. In other embodiments, the interface can store the first and second plane pipeline commands when a read process is performed on the first plane and/or the second plane, and output the first and second plane pipeline commands to the first and second planes synchronously. Therefore, the first and second plane pipeline commands can be performed on the first and second planes synchronously, even if they are issued by the host asynchronously.

Compared with a traditional hard disk drive (HDD), which works by using a mechanical drive head that must physically move to access locations on a rapidly spinning magnetic disk, a solid state drive (SSD) is just a thin wedge of flash memory and has no moving parts, and data stored in the flash memory can be accessed on any location on the SSD with equally fast speed and precision. Thus, SSD random read processes can be performed 10-50 times faster than the traditional HDD random read processes.

Generally speaking, there are two types of flash memory, NOR and NAND. Several factors favor the use of NAND over NOR flash memory cells. For example, due to the fact that a NOR flash memory cell requires a separate metal contact, a standard NAND flash memory cell is smaller than a standard NOR flash memory cell, for example $4F^2$ verses $10\ F^2$, and can be made denser and consequently cheaper than the NOR flash memory cell.

FIG. 1 shows an exemplary NAND flash memory cell 100 according to some embodiments of the disclosure. The NAND cell 100 can store electrical charges in a floating gate 130, which is isolated above and below by an upper oxide insulating layer 140 and a lower oxide insulating layer 120, respectively. When the floating gate 130 is charged, the NAND cell 100 can be programmed, representing a binary value "0." When the floating gate 130 has no charge, the NAND cell 100 can be erased, representing a binary value "1." To program the NAND cell 100, a high voltage can be applied to a control gate 150 above the upper oxide insulating layer 140, and electrons will move from a silicon substrate 110 below the lower oxide insulating layer 120 to the floating gate 130 by "tunneling" through the lower oxide insulating layer 120. The electrons can then be trapped in the floating gate 130 for up to several years. To erase the NAND cell 100, a high voltage can be applied to the silicon substrate 110, and electrons will move from the floating gate 130 to the silicon substrate 110. To read the NAND cell 100, a read reference voltage can be applied to the control gate 150. When there is a current flow between a source 160 and a drain 170, the floating gate 130 is not charged and the binary value "1" shall be read. When there is no current flow between the source 160 and the drain 170, the floating gate 130 is charged and the binary value "0" shall be read.

The example shown in FIG. 1 is a single-level cell (SLC) NAND cell, which can store one bit of data. There are also multi-level cell (MLC) NAND cells, triple-level cell (TLC) NAND cells and quad-level cell (QCL) NAND cells, which can store two, three and four bits of data, respectively. The one, two, three, and four bits of data correspond to two, four, eight and sixteen distinct voltage levels, respectively. The maximum voltage applied to each NAND cell is approximately the same. Therefore, an SLC NAND cell can have a sufficiently large guard band between its two voltage levels, and be able to withstand temperature extremes and other adverse effects, such as the degrading rate, much better than MLC, TLC and QLC NAND cells.

Figure 2:
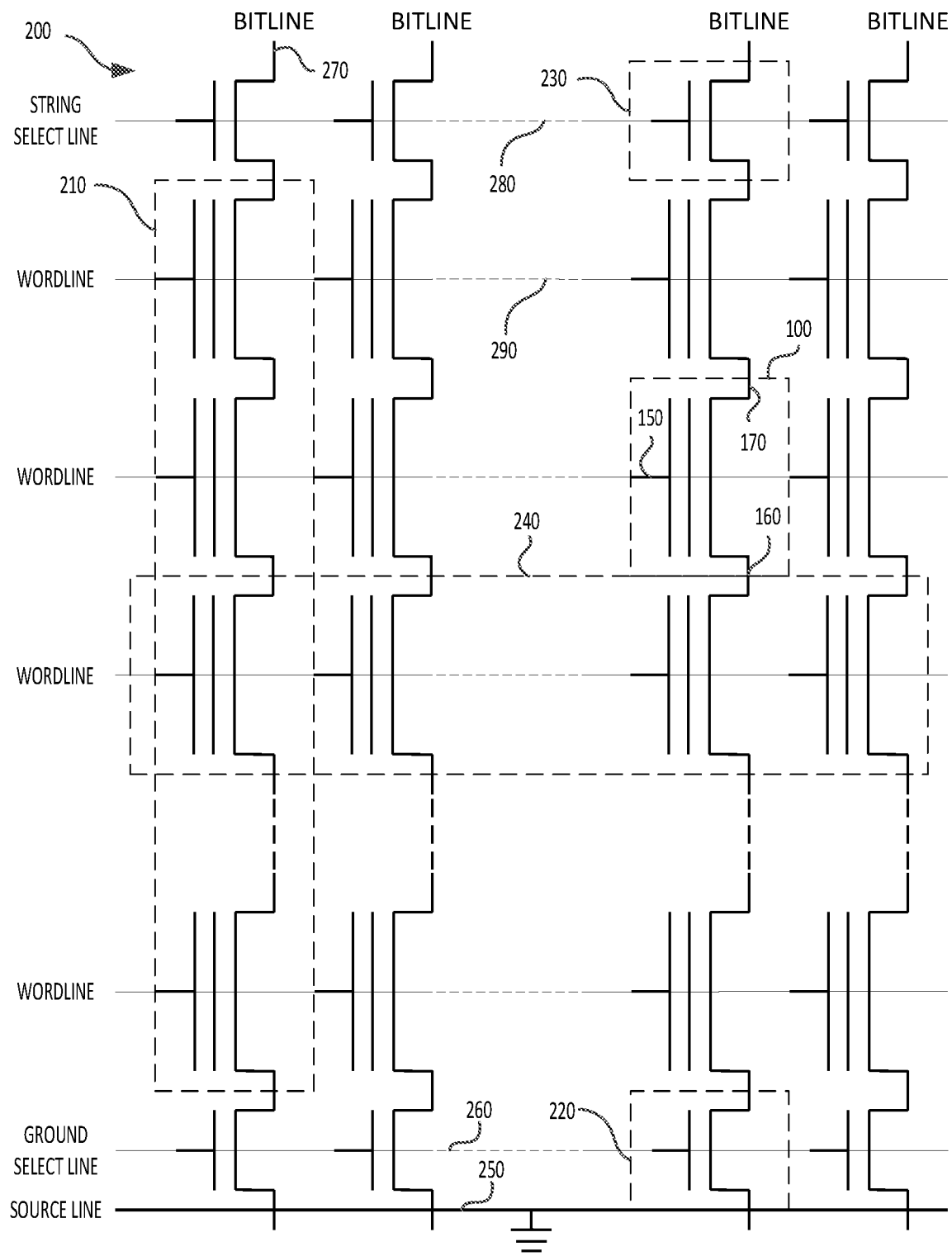
FIG. 2 shows an exemplary NAND flash memory block according to some embodiments of the disclosure.

FIG. 2 shows an exemplary NAND flash memory block 200 according to exemplary embodiments of the disclosure. Blocks are the minimum unit to erase. The NAND block 200 can include a plurality of the SLC NAND cells 100 arranged in an array. In other embodiments, the NAND block 200 can include a plurality of MLC, TLC, or QLC NAND cells. Strings 210 (shown as columns) in the NAND block 200 are the minimum unit to read and each can typically include 32 or 64 of the NAND cells 100 connected in series with each other, with each of the NAND cells 100 representing a bit of data (binary value "0" or "1").

As shown, each of the strings 210 is connected at one end to a common source line 250 via a ground select line (GSL) transistor 220 controlled by a ground select line 260 and at the other end to a bitline 270 via a string select line (SSL) transistor 230 controlled by a string select line 280. Operations of each of the strings 210 can be controlled by turning its GSL transistor 220 and SSL transistor 230 on or off. For example, the SSL transistor 230 can be used to enable operations of a string, and the GSL transistor 230 can be used to connect the string to ground during a read process. In order to read a single NAND cell of the string, all remaining NAND cells (i.e., unread NAND cells) of the same string must be switched on (e.g., by applying a pass-through voltage thereto) to allow the binary value of the single NAND cell that is being read to pass through to a sense amplifier (not shown) connected to the string. Pages 240 (shown as rows) in the NAND block 200 are the minimum unit to program and each can typically include at least 32,768 (i.e., 4K) of the NAND cells 100 that share the same wordline 290.

Figure 3:
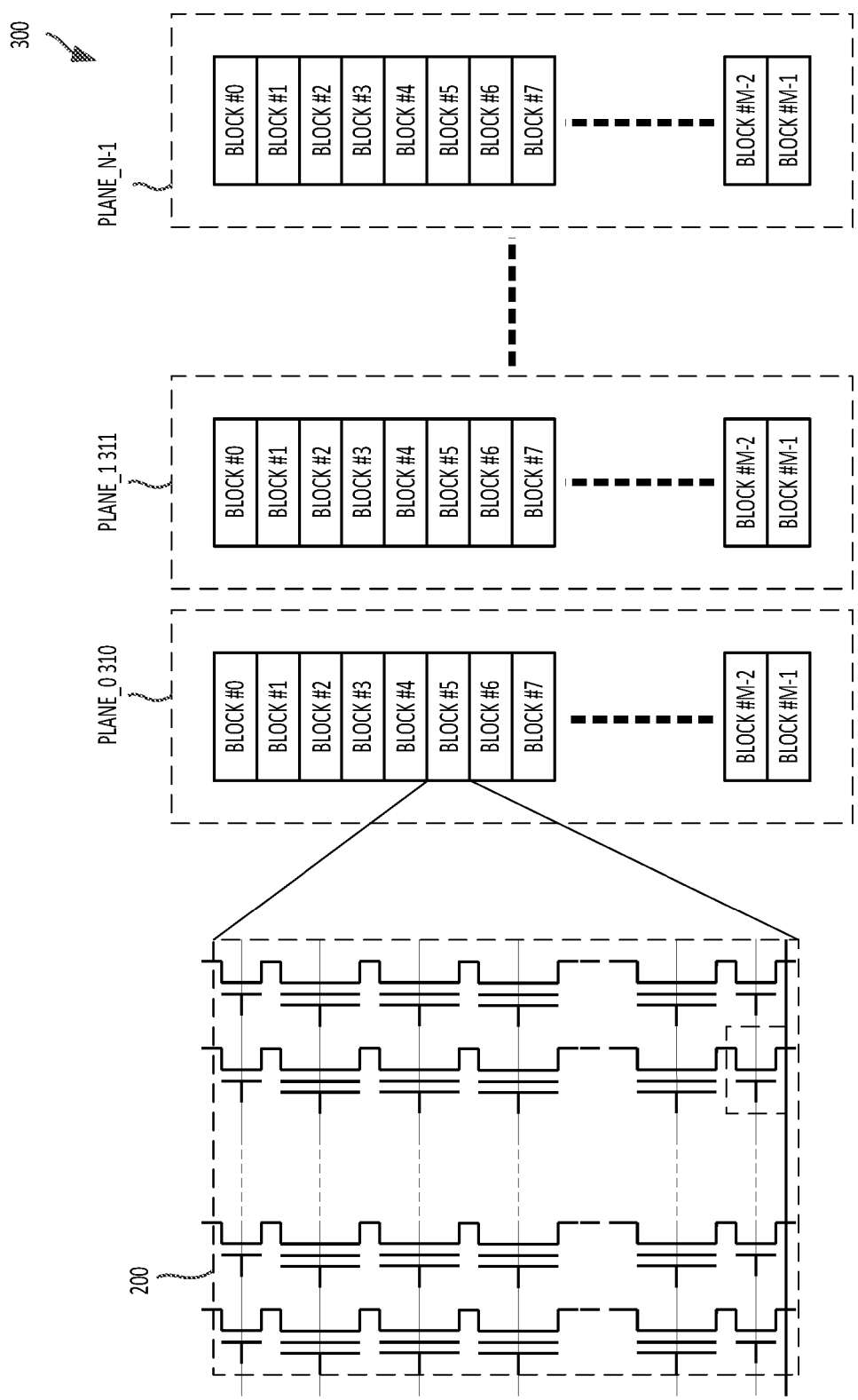
FIG. 3 shows an exemplary multi-plane NAND flash memory die according to some embodiments of the disclosure.

FIG. 3 shows an exemplary multi-plane NAND flash memory die 300 according to exemplary embodiments of the disclosure. The NAND die 300 can include a plurality of NAND flash memory planes 0 to n−1, which can be stacked on top of one another. For example, the NAND die 300 can include two planes, e.g., a plane_0 310 and a plane_1 311. The NAND die 300 can also include four or six planes. Each of the NAND planes_0 to n−1 can include a plurality of the NAND blocks 200, e.g., NAND blocks #0 to #m−1. One or a plurality of the NAND dies 300 can form an NAND flash memory chip. An SSD can include several NAND chips, which are connected to an NAND flash memory controller using multiple channels.

Figure 4:
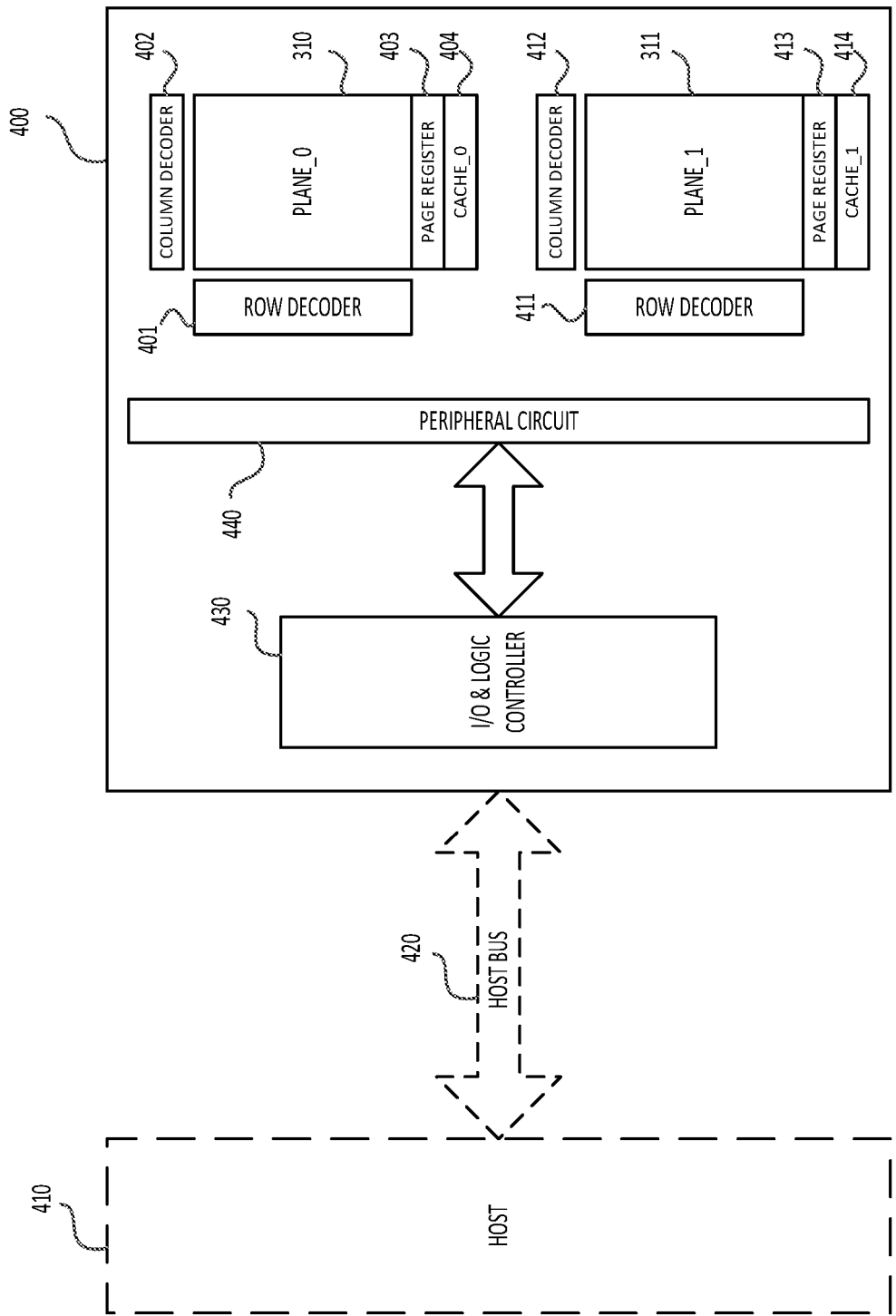
FIG. 4 shows an exemplary solid state drive (SSD) according to some embodiments of the disclosure.

FIG. 4 shows an exemplary SSD 400 according to exemplary embodiments of the disclosure. The SSD 400 can communicate with a host 410 via a host bus 420. For example, the host 410 can transmit commands and data via the host bus 420 to the SSD 400, and the SSD 400 can transmit data via the host bus 420 to the host 410. The host 410 can be a computer. The host bus 420 can be a universal serial bus (USB), a serial advanced technology attachment (SATA), a parallel advanced technology attachment (PATA) or a peripheral component interconnect express (PCIe). The SSD 400 can include the NAND die 300 (e.g., the plane_0 310 and the plane_1 311), an I/O and logic controller 430 and a peripheral circuit 440.

The peripheral circuit 440 can include an address register, a status register, a logic control circuit, an I/O circuit, a ready/busy control circuit (not shown), etc., and be coupled between the I/O and logic controller 430 and row decoders 401 and 411, column decoder 402 and 412, the plane_0 310 and the plane_1 311. The peripheral circuit 440 can receive various control signals from the I/O and logic controller 430, such as a chip enable signal, a command latch enable signal, an address latch enable signal, a write enable signal, a read enable signal, etc. The peripheral circuit 440 can further transmit write data from the I/O and logic controller 430 to the plane_0 310 and the plane_1 311 and read data from the plane_0 310 and the plane_1 311 to the I/O and logic controller 430. The row decoders 401 and 411 can select wordlines corresponding to target memory cells of the plane_0 310 and the plane_1 311, respectively, and apply desired voltages to the selected wordlines and other unselected wordlines. Page registers 403 and 413 can hold data during the operations of the plane_0 310 and the plane_1 311. Cache_0 404 and cache_1 414 can be included in respective sense amplifiers (not shown), and can read data from the plane_0 310 and the plane_1 311, respectively and output the data to the I/O and logic controller 430, and transmit write data from the I/O and logic controller 430 to the plane_0 310 and the plane_1 311, respectively.

The I/O and logic controller 430 can have a variety of functions, such as wearing levelling, error checking and correction, write abort, defect management, and garbage collection. The I/O and logic controller 430 can also control the plane_0 310 and the plane_1 311 of the NAND die 300 to read, write, erase, and the like in response to commands transmitted from the host 410. The controller I/O and logic 430 can further transmit and receive input/output signals to and from the plane_0 310 and the plane_1 311. For example, the I/O and logic controller 430 can transmit various control signals to the plane_0 310 and/or the plane_1 311, and receive ready/busy signals (e.g., true_rbn_p0 and true_rbn_p1 shown in FIG. 5) from the plane_0 310 and the plane_1 311, respectively. The ready/busy signals can be used to indicate whether the plane_0 310 and the plane_1 311 are in a ready state or a busy state. The ready state can refer to a state in which the plane_0 310 and the plane_1 311 may receive a command. The busy state can refer to another state in which, for example, a read process is performed on the plane_0 310 and the plane_1 311, and the plane_0 310 and the plane_1 311 may not receive a command. For example, true_rbn_p0 can be considered to be at an "L" level while the plane_0 310 is busy performing a read process and may not receive a command. For another example, true_rbn_p1 can be considered to be at an "H" level while the plane_1 311 completes the read process and is ready to receive a command.

The I/O and logic controller 430 can also transmit and receive various control signals to and from the host 410. For example, data read from the plane_0 310 and the plane_1 311 can be stored in caches (e.g., the cache_0 404 and the cache_1 414) temporarily, and cache_rbn_p0 and cache_rbn_p1 (shown in FIG. 5) can be used to notify the host 410 of whether the cache_0 404 and the cache_1 414 are in a ready state or a busy state. For example, cache_rbn_p0 can be considered to be at an "L" level while a read process performed on the plane_0 310 is not complete, data stored in the plane_0 310 has not cached into the cache_0 404 completely and the host 410 is not allowed to take the data cached in the cache_0 404. For another embodiment, cache_rbn_p1 can be considered to be at an "H" level while a read process performed on the plane_1 311 is complete, data stored in the plane_1 311 has been cached in the cache_1 completely and the host 410 can now be allowed to take the data cached in the cache_1 414.

A read process can be performed on one of the plane_0 310 and the plane_1 311 of the NAND die 300 at a time, e.g., a single-plane read process. For example, the host 410 can issue and transmit a read command "ooh" via the host bus 420 to the I/O and logic controller 430. The read command "ooh" can be equivalent to an address input reception command for reading and be used for instructing the NAND die 300 to perform a read process. Next, the host 410 can transmit to the I/O and logic controller 430 address information add0_p0, which includes information for designating the plane_0 310, and the I/O and logic controller 430 can transmit the address information add0_p0 to the plane_0 310 of the NAND die 300. Then, the host 410 can issue and transmit a read start command "30h" to the I/O and logic controller 430 to instruct the plane_0 310 to start a read process based on the read start command and the address information add0_p0. The plane_0 310 can then enter from the ready state to the busy state, which is indicated by true_rbn_p0 of an "L" level that is changed from an "H" level. When the read process ends, the plane_0 310 can enter the ready state, which is indicated by true_rbn_p0 of an "H" level, data stored in the plane_0 310 designated by the address information add0_p0 can be cached in the cache_0 404, and the host 410 can then take the data stored in the cache_0 404.

The plane_0 310 and the plane_1 311 of the NAND die 300 can also be read during a multi-plane read process synchronously or asynchronously to improve the read throughput, thereby resulting in a high chip throughput. For example, in a synchronous multi-plane independent (MPI) read scheme the I/O and logic controller 430 can transmit the read command "ooh" (issued from the host 410) to the NAND die 300. Then, the I/O and logic controller 430 can transmit address information add0_p0, which includes information for designating the plane_0 310. Next, the I/O and logic controller 430 can transmit to the NAND die 300 a multi-plane read command "32h," which is used to instruct a synchronous MPI process and indicate that the commands and the address information transmitted until now correspond to one plane. Subsequently, the I/O and logic controller 430 can transmit the read command "ooh," address information add1_p1, which includes information for designating the plane_1 311, and the read start command "30h" to the plane_1 311 sequentially. A multi-plane read process can be performed on the plane_0 310 and the plane_1 311 synchronously, during which the plane_0 310 and the plane_1 311 can enter the busy state, which can be indicated by true_rbn_p0 of an "L" level and true_rbn_p1 of an "L" level, respectively.

When the synchronous MPI process ends, the plane_0 310 and the plane_1 311 can enter the ready state, which can be indicated by true_rbn_p0 of an "H" level and true_rbn_p1 of an "H" level, respectively, and data stored in the plane_0 310 designated by the address information add0_p0 and data stored in the plane_1 311 designated by the address information add1_p1 can be cached in the cache_0 404 and the cache_1 414, respectively. To achieve the synchronous MPI process, read commands, before output to the plane_0 310 and the plane_1 310, have to be aligned with each other, which involves an extra firmware complexity for the host 410.

In an asynchronous multi-plane independent (AMPI) read scheme, the host 410 can issue and transmit two read commands and corresponding address information for the plane_0 310 and the plane_1 311 to the I/O and logic controller 430 at different time, and the I/O and logic controller 430 can transmit the two asynchronous read commands to the plane_0 310 and the plane_1 311 to perform a read process on each of the plane_0 310 and the plane_1 311. To achieve the AMPI process, extra circuits are required to support independent wordline biases for the plane_0 310 and the plane_1 311. Besides, the plane_0 310 and the plane_1 311 have to have their own respective charge pumps and regulators, in order to mitigate the noise injections. The advanced 3D NAND flash memory design has employed circuit under array (CUA) or x-tacking to hide complementary metal oxide semiconductor (CMOS) circuits under the array to reduce the overall die size. It is becoming difficult, or even impossible, to perform CUA or x-tacking on a small, dense die, as such die cannot hide all periphery circuits.

Figure 5:
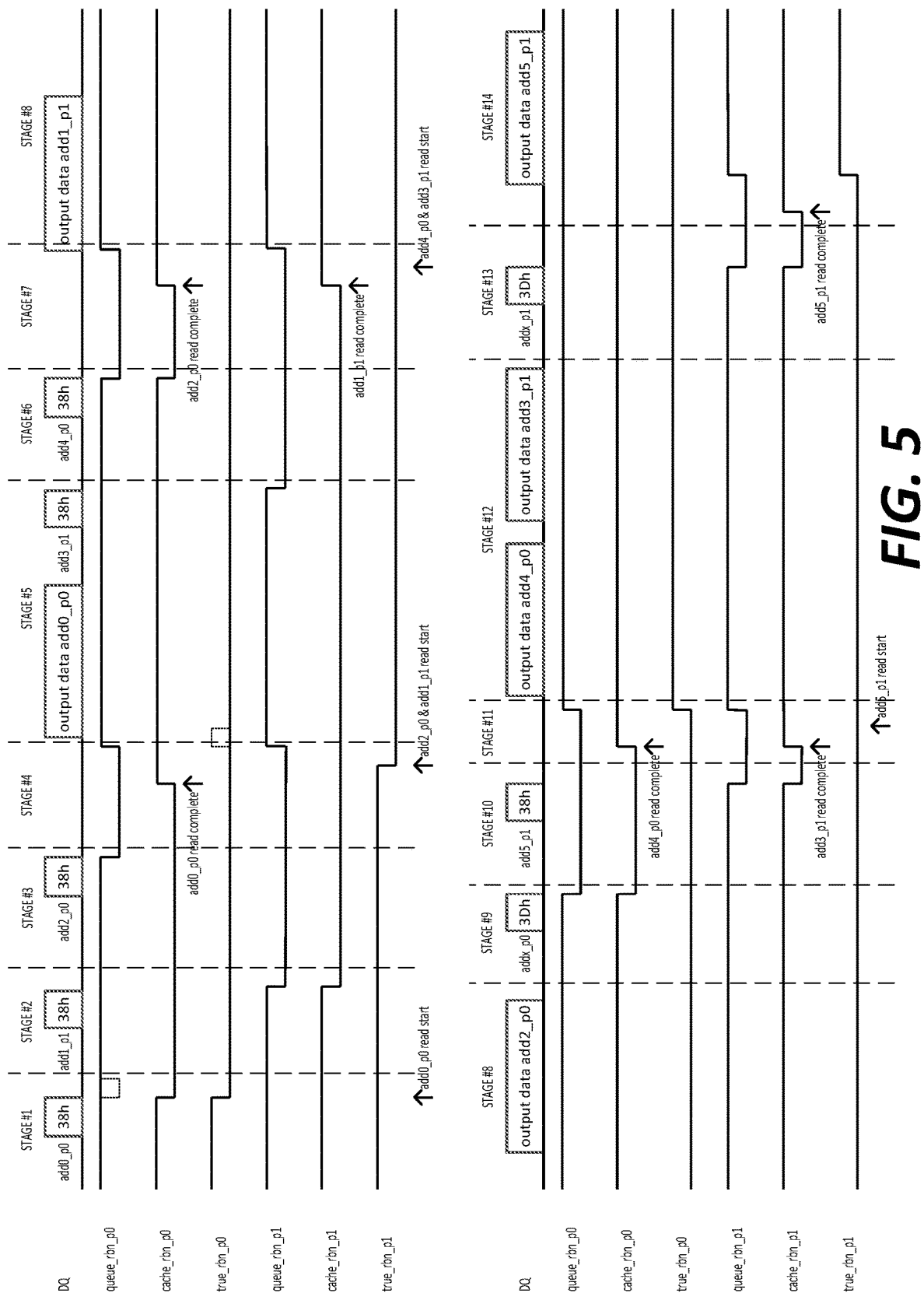
FIG. 5 shows an exemplary timing diagram illustrating a pseudo asynchronous multi-plane read process according to some embodiments of the disclosure.

FIG. 5 shows an exemplary timing diagram illustrating a pseudo asynchronous multi-plane independent (PAMPI) read scheme according to exemplary embodiments of the disclosure. In the pseudo asynchronous multi-plane independent read scheme, read commands, which can be issued to be performed on different planes from the host 410 synchronously or asynchronously, can be performed on the SSD 400 synchronously. For example, synchronous or asynchronous read commands to be performed on the plane_0 310 and the plane_1 311 can be stored in distinct storage units, e.g., queue_0 and queue_1, respectively, when a read process is performed on the plane_0 310 and/or the plane_1 311, and then output to and performed on the plane_0 and the plane_1 311 synchronously when no read process is performed on the plane_0 310 and the plane_1 311.

Initially, queue_0 and queue_1 can be empty, and queue_rbn_p0 and queue_rbn_p1, which indicate whether queue_0 and queue_1 are in a busy state or a ready state, can be both at an "H" level, which indicates that both queue_0 and queue_1 are in the ready state and ready to receive and store a read command; no read process is performed on the plane_0 310 and the plane_1 311, and true_rbn_p0 and true_rbn_p1, which indicate whether the plane_0 310 and the plane_1 311 are in a busy state or a ready state, are both at an "H" level, which indicates that the plane_0 310 and the plane_1 311 are in the ready state and ready for a read process to be performed thereon; and cache_rbn_p0 and cache_rbn_p1 are also in an "H" level.

At stage #1, a read command add0_p0 "38h" can be received and will be performed on the plane_0 310. For example, the read command add0_p0 "38h" shown in FIG. 5 can include a plane_0 pipeline read command and corresponding plane_0 address information. As no read command, and no read process is performed on the plane_0 310 and the plane_1 311 and queue_0 and queue_1 are both empty, the read command add0_p0 "38h" is performed on the plane_0 310. As no read command is stored in queue_0 and queue_1, queue_0 and queue_1 are still empty and queue_rbn_p0 and queue_rbn_p1 are still at an "H" level. In some embodiments, queue_rbn_p0 will become at an "L" level and return to an "H" level immediately, as indicated by the dashed line. As the read command add0_p0 "38h" is being performed on the plane_0 310, true_rbn_p0 becomes at an "L" level, and cache_rbn_p0 also becomes at an "L" level, which indicates that data stored in the plane_0 310 addressed by the plane_0 address information is being cached into the cache_0 404, and the cache_0 404 is in a busy state and not ready to be accessed by the host 410. As no read command is being performed on the plane_1 311, true_rbn_p1 is still at an "H" level, and cache_rbn_p1 is also still at an "H" level.

At stage #2, a read command add1_p1 "38h" can be received and will be performed on the plane_1 311. For example, the read command add1_p1 "38h" shown in FIG. 5 can include a plane_1 pipeline read command and corresponding plane_1 address information. As the read command add0_p0 "38h," and accordingly a read process, are performed on the plane_0 310, the read command add1_p1 "38h" will not be performed, but is stored in queue_1. Accordingly, queue_rbn_p1 becomes at an "L" level, which indicates that queue_1 is not empty, and cache_rbn_p1 becomes at an "L" level, which indicates that no data is ready for the host 410 to take therefrom.

At stage #3, a read command add2_p0 "38h" can be received and will be performed on the plane_0 310. For example, the read command add2_p0 "38h" shown in FIG. 5 can include a plane_0 pipeline read command and corresponding plane_0 address information. As the read command add0_p0 "38h," and accordingly a read process, are performed on the plane_0 310, the read command add2_p0 "38h" will not be performed, but is stored in queue_0. Accordingly, queue_rbn_p0 becomes at an "L" level, which indicates that queue_0 is not empty.

At stage #4, the read process performed by the read command add0_p0 "38h" on the plane_0 310 is complete, and cache_rbn_p0 becomes at an "H" level, which indicates that data stored in the plane_0 310 addressed by the plane_0 address information is being cached into the cache_0 404, and the cache_0 404 is in a ready state and ready to be accessed by the host 410. In some embodiments, true_rbn_p0 may become at an "H" level, as indicated by the dashed line, after the read process performed by the read command add0_p0 "38h" on the plane_0 310 is complete. In other embodiments, as the read commands add2_p0 "38h" and add1_p1 "38h" stored in the cache_0 404 and the cache_1 414, respectively, are performed immediately after the read command add0_p0 "38h" is performed completely, a discharge process performed on the plane_0 310 is not complete yet, and true_rbn_p0 can be still at an "L" level. After the read commands add2_p0 "38h" and add1_p1 "38h" are performed on the plane_0 and the plane_1, respectively, queue_rbn_p0 and queue_rbn_p1 become at an "H" level again, which indicates that they are empty and ready to store a read command. Besides, true-rbn_p1 becomes at an "L" level as the read command add1_p1 "38h" is performed on the plane_1 311. Therefore, the read commands add2_p0 "38h" and add1_p1 "38h," though received asynchronously, can be performed synchronously.

At stage #5, the data cached in cache_0 can be output to the host 410, and a read command add3_p1 "38h" can be received. For example, the read command add3_p1 "38h" shown in FIG. 5 can include a plane_1 pipeline read command and corresponding plane_1 address information. As the read commands add2_p0 "38h" and add1_p1 "38h," and accordingly read processes, are performed on the plane_0 310 and the plane_1, respectively, the read command add3_p1 "38h" will not be performed, but stored in queue_1. Accordingly, queue_rbn_p1 becomes at an "L" level, which indicates that queue_1 is not empty.

At stage #6, a read command add4p0 "38h" can be received. For example, the read command add4p0 "38h" shown in FIG. 5 can include a plane_0 pipeline read command and corresponding plane_0 address information. As the read commands add2p0 "38h" and add1_p1 "38h," and accordingly read processes, are performed on the plane_0 310 and the plane_1, respectively, the read command add4p0 "38h" will not be performed, but is stored in queue_0. Accordingly, queue_rbn_p0 becomes at an "L" level, which indicates that queue_0 is not empty. Cache_rbn_p0 also becomes at an "L" level, after the read command add4p0 "38h" is received, as cache_0 is going to cache data stored in the plane_0 addressed by the plane_0 address information and cannot be accessed by the host 410.

At stage #7, the read processes performed by the read commands add2_p0 "38h" and add1_p1 "38h" on the plane_0 310 and the plane_1, respectively, can be complete, and cache_rbn_p0 and cache_rbn_p1 can become at an "H" level, which indicates that data stored in the plane_0 310 addressed by the plane_0 address information and data stored in the plane_1 311 addressed by the plane_1 address information are being cached into the cache_0 404 and the cache_1 414, respectively, and the cache_0 404 and the cache_1 414 are both in a ready state and ready to be accessed by the host 410. After the read processes performed by the read commands add2_p0 "38h" and add1_p1 "38h" are complete, the read commands add4_p0 "38h" and add3_p1 "38h" stored in the queue_0 610 and the queue_1 620, respectively, are output and performed, and queue_rbn_p0 and queue_rbn_p1 become at an "H" level, which indicates that queue_0 and queue_1 are empty and ready to receive and store a read command. The read commands add4_p0 "38h" and add3_p1 "38h," though received asynchronously, can also be performed synchronously.

At stage #8, the data cached in cache_0 and cache_1 can be output to the host 410. FIG. 5 shows that the data read from the plane_1 311 and cached in cache_1 in response to the read command add1_p1 "38h" can be output prior to the data read from the plane_0 310 and cached in cache_0 in response to the read command add2_p0 "38h." In some embodiments, the data read from the plane_0 310 and cached in cache_0 in response to the read command add2_p0 "38h" can also be output prior to the data read from the plane_1 311 and cached in cache_1 in response to the read command add1_p1 "38h."

At stage #9, a read command addx_p0 "3Dh" can be received and will be performed on the plane_0 310. For example, the read command addx_p0 "3Dh" shown in FIG. 5 can include a plane_0 pipeline read end command. In some embodiments, the read command addx_p0 "3Dh" does not correspond to any address information. As the read processes are being performed by the read commands add4_p0 "38h" and add3_p1 "38h" on the plane_0 310 and the plane_1 311, respectively, the read command addx_p0 "3Dh" will not be performed, but is stored in queue_0. Accordingly, queue_rbn_p0 becomes at an "L" level, which indicates that queue_0 is not empty, and cache_rbn_p0 becomes at an "L" level, which indicates that no data is ready for the host 410 to take therefrom.

At stage #10, a read command add5_p1 "38h" can be received. For example, the read command add5_p1 "38h" shown in FIG. 5 can include a plane_1 pipeline read command and corresponding plane_1 address information. As the read commands add4_p0 "38h" and add3_p1 "38h," and accordingly read processes, are being performed on the plane_0 310 and the plane_1, respectively, the read command add5_p0 "38h" will not be performed, but is stored in queue_1. Accordingly, queue_rbn_p1 becomes at an "L" level, which indicates that queue_1 is not empty. Cache_rbn_p1 also becomes at an "L" level after the read command add5_p1 "38h" is received, as the cache_1 414 is going to cache the data stored in the plane_1 311 during the read process performed by the read command add3_p1 "38h" and cannot be accessed by the host 410.

At stage #11, the read processes performed by the read commands add4_p0 "38h" and add3_p1 "38h" on the plane_0 and plane_1, respectively, can be complete, and then cache_rbn_p0 and cache_rbn_p1 become at an "H" level, which indicates that data stored in the plane_0 310 addressed by the plane_0 address information and data stored in the plane_1 311 addressed by the plane_1 address information are being cached into the cache_0 404 and the cache_1 414, respectively, and the cache_0 404 and the cache_1 414 are both in a ready state and ready to be accessed by the host 410. Then the read command addx_p0 "3Dh" stored in queue_0 and the read command add5_p1 "38h" stored in queue_1 can be performed on the plane_0 310 and the plane_1 311, respectively. Accordingly, queue_rbn_p0 and queue_rbn_p1 become at an "H" level, which indicates that queue_0 and queue_1 are empty and ready to receive and store a read command. After the read command addx_p0 "3Dh" is performed on the plane_0, no read command is stored in queue_0 and will be performed, the discharge process can be performed on the plane_0 310 completely, and true_rbn_p0 becomes at an "H" level thereafter.

At stage #12, the data cached in cache_0 and cache_1 are output to the host 410. FIG. 5 shows that the data read from the plane_0 310 and cached in cache_0 in response to the read command add4 p0 "38h" is output prior to the data read from the plane_1 311 and cached in cache_1 in response to the read command add3 p1 "38h." In some embodiments, the data read from the plane_1 311 and cached in cache_1 in response to the read command add3 p1 "38h" can also be output prior to the data read from the plane_0 310 and cached in cache_0 in response to the read command add4_p0 "38h."

At stage #13, a read command addx_p1 "3Dh" is received and will be performed on the plane_1 311. For example, the read command addx_p1 "3Dh" shown in FIG. 5 can include a plane_1 pipeline read end command. In some embodiments, the read command addx_p1 "3Dh" does not correspond to any address information. As the read process is still being performed by the read command add5 p1 "38h" on the plane_1 311, the read command addx_p1 "3Dh" will not be performed, but is stored in queue 1. Accordingly, queue_rbn_p1 becomes at an "L" level, which indicates that queue_1 is not empty, and cache_rbn_p1 becomes at an "L" level, which indicates that cache_1 is going to cache the data read from the plane_1 in response to the read command add5 p1 "38h" and no data is ready for the host 410 to take therefrom.

At stage #14, the read process performed by the read command add5_p1 "38h" is complete, and then cache_rbn_p1 becomes at an "H" level, which indicates that data stored in the plane_1 311 addressed by the plane_1 address information is being cached into the cache_1 414, and the cache_1 414 is in a ready state and ready to be accessed by the host 410. Then the read command addx_p1 "3Dh" stored in queue_1 is performed on the plane_1 311. Accordingly, queue_rbn_p1 becomes at an "H" level, which indicates that queue_1 is empty and ready to receive and store a read command, and true_rbn_1 also becomes at an "H" level.

The PAMPI read scheme can be used in different plane configurations. Table 1 lists some possible configurations of the multi-plane flash memory 400. The area cost of the multi-plane flash memory 400 increases downward, which indicates that the more the PAMPI process the flash memory 400 employs, the less the cost of the flash memory 400.

TABLE 1

| | Two planes | Four planes | Six planes |
|---|---|---|---|
| Possible Plane Configurations | 2-way PAMPI | 4-way PAMPI | 6-way PAMPI |
| | | 2-way AMPI + 2-way PAMPI | 2-way AMPI + 3-way PAMPI |
| | 2-way AMPI | 4-way AMPI | 3-way AMPI + 2-way PAMPI |
| | | | 6-way AMPI |

Therefore, compared with the conventional AMPI read scheme, the PAMPI read scheme according to some embodiments of the disclosure can have a circuit area cost greatly reduced. Besides, the host 410 does not need to align the read requests for different planes, which involves an extra firmware complexity and overhead for the host 410. The PAMPI read scheme can also greatly improve the random read performance. Unlike the AMPI read scheme, the PAMPI read scheme does not suffer noise interference between different planes, as the read processes on the different planes are performed synchronously internally.

Figure 6:
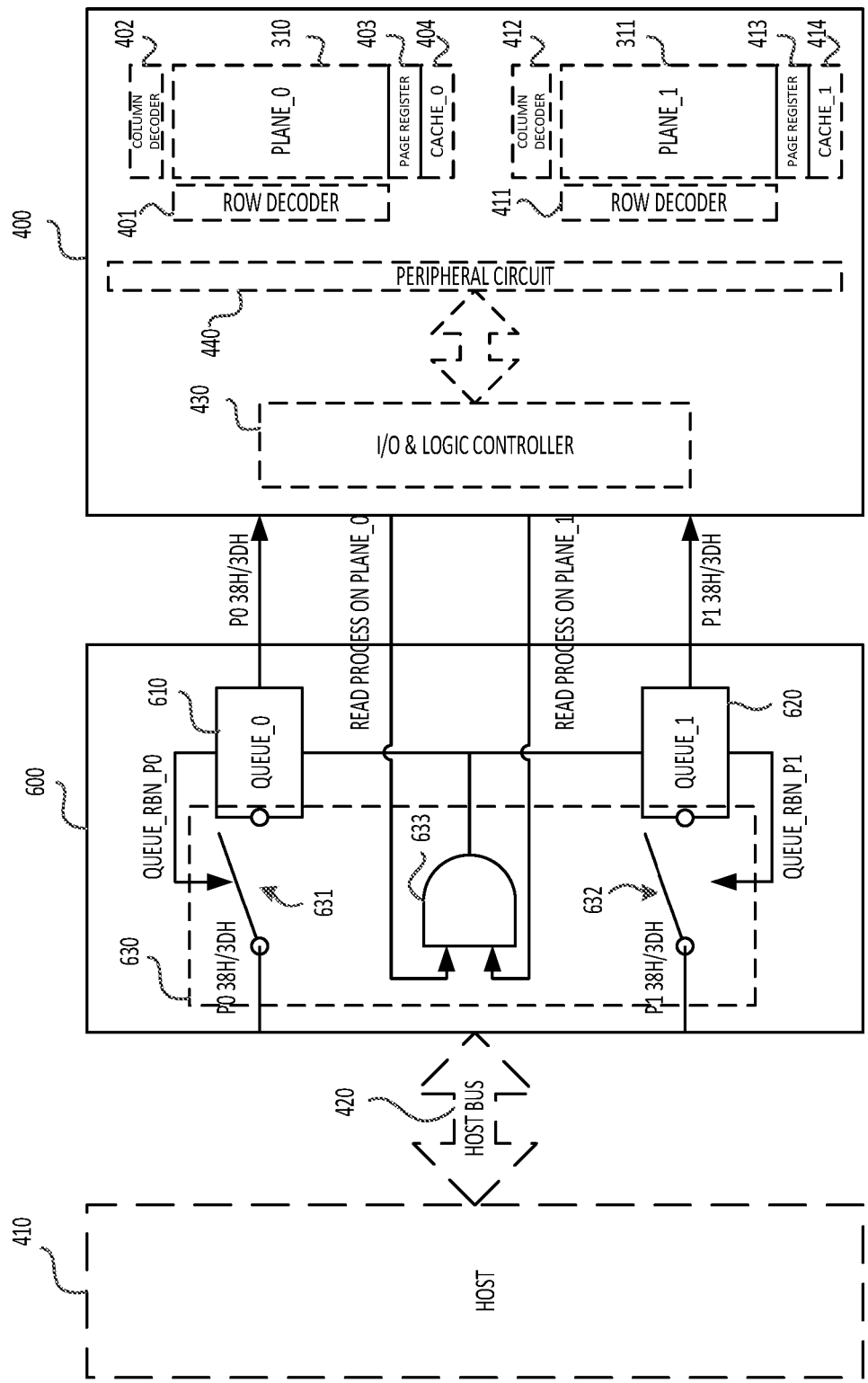
FIG. 6 shows a functional block diagram of an exemplary interface implementing the pseudo asynchronous multi-plane read process according to some embodiments of the disclosure.

FIG. 6 shows a functional block diagram of an exemplary interface 600 according to some embodiments of the disclosure. The interface 600 can implement the pseudo asynchronous multi-plane read process. In some embodiments, the interface 600 can be stand-along and disposed between the host 410 and the SSD 400. For example, the host 410 can be a computer, and can issue the first plane pipeline command and the second plane pipeline command synchronously or asynchronously. In other embodiments, the interface 600 can be installed in the SSD 400. For example, the SSD 400 can be a flash memory, such as a NAND flash memory. In some embodiments, the flash memory 400 can perform read processes on the first plane 310 and the second plane 311 synchronously. The interface 600 can include a first storage unit 610 (e.g., a first memory), a second storage unit 620 (e.g., a second memory) and a controller 630. In an embodiment, the controller 630 can be distinct from the I/O & logic controller 430. In another embodiment, the controller 630 and the I/O & logic controller 430 can be included in a single processing chip. In some embodiments, the first storage unit 610 can be distinct from the second storage unit 620. In other embodiments, the first storage unit 610 and the second storage unit 620 can be included in a single storage unit. For example, the first storage unit 610 can be a queue (e.g., queue_0 shown in FIG. 6), and the second storage unit 620 can also be a queue (e.g., queue_1 shown in FIG. 6). In various embodiment, at least one of the first storage unit 610 and the second storage unit 620 can be included in the flash memory 400.

The first storage unit 610 can be configured to receive and store a first plane pipeline command issued from the host 410, and output the first plane pipeline command to a first plane (e.g., the plane_0 311) of the flash memory 400. For example, the first plane pipeline command can include a first plane pipeline read command (e.g., add0_p0 "38h", add2_p0 "38h" and add4_p0 "38h") and a first plane pipeline read end command (e.g., addx_p0 "3Dh"). In some embodiments, the first storage unit 610 can no longer store a first plane pipeline command when the first storage unit 610 is not empty. For example, the first storage unit 610 can store either the first plane pipeline read command or the first plane pipeline read end command at a time. For another example, the first storage unit 610 can store only one of the first plane pipeline read command at a time.

The second storage unit 620 can be configured to receive and store a second plane pipeline command issued from the host 410, and output the second plane pipeline command to a second plane (e.g., the plane_1 311) of the flash memory 400. For example, the second plane pipeline command can include a second plane pipeline read command (e.g., add1_p1 "38h", add3_p1 "38h" and add5_p1 "38h") and a second plane pipeline read end command (e.g., addx_p1 "3Dh"). In some embodiments, the second storage unit 620 can no longer store a second plane pipeline command when the second storage unit 620 is not empty. For example, the second storage unit 620 can store either the second plane pipeline read command or the second plane pipeline read end command at a time. For another example, the second storage unit 620 can store only one of the second plane pipeline read command at a time.

The controller 630 can be electrically connected to the first storage unit 610 and the second storage unit 620, and configured to output the first plane pipeline command to the first plane 310 and the second plane pipeline command to the second plane 311 when no read process is performed on the first plane 310 and the second plane 311 of the flash memory 400. For example, when receiving a signal "read process on plane_0" indicates that no read process is performed on the plane_0 310 of the flash memory 400 and a signal "read process on plane_1" indicates that no read process is performed on the plane_1 311 of the flash memory 400, the controller 630 can control the first plane pipeline command stored in the first storage unit 610 and the second pipeline command stored in the second storage unit 620 to be output and performed synchronously on the plane_0 310 and the plane_1 311, respectively. In some embodiments, the controller 630 can include an AND gate 633, which can receive the signals "read process on plane_0" and "read process on plane_1" and control the first plane pipeline command stored in the first storage unit 610 and the second pipeline command stored in the second storage unit 620 to be output and performed synchronously on the plane_0 310 and the plane_1 311, respectively, when the signal "read process on plane_0" indicates that no read process is performed on the plane_0 310 of the flash memory 400 (e.g., the signal "read process on plane_0" being at an "H" level) and the signal "read process on plane_1" indicates that no read process is performed on the plane_1 311 of the flash memory 400 (e.g., the signal "read process on plane_1" being at an "H" level).

In some embodiments, the controller 630 can further include a first switch 631 and/or a second switch 632. For example, the first switch 631 can have one end electrically connected to the first storage unit 610 and the other end electrically connected to the host 410 for receiving the first plane pipeline command, and the second switch 632 can have one end electrically connected to the second storage unit 620 and the other end electrically connected to the host 410 for receiving the second plane pipeline command. The first switch 631 can be close after the first storage unit 610 is empty, e.g., by receiving queue_rbn_p0 being at an "H" level, and the first plane pipeline read command, either one of the first plane pipeline read commands (e.g., add0_p0 "38h", add2_p0 "38h" and add4_p0 "38h") or the first plane pipeline read end command (e.g., addx_p0 "3Dh"), can be stored in the first storage unit 610. The second switch 632 can be close after the second storage unit 620 is empty, e.g., by receiving queue_rbn_p1 being at an "H" level, and the second plane pipeline command, either one of the second plane pipeline read commands (e.g., add1_p1 "38h", add3_p1 "38h" and add5_p1 "38h") or the second plane pipeline read end command (e.g., addx_p1 "3Dh"), can be stored in the second storage unit 620.

In various embodiments according to the disclosure, the controller 630 of the interface 600 can include circuitry configured to perform the functions and processes described herein in combination with software or without software. In various examples, the controller 630 can be a digital signal processor (DSP), an application specific integrated circuit (ASIC), programmable logic devices (PLDs), field programmable gate arrays (FPGAs), digitally enhanced circuits, or comparable device or a combination thereof. In some other embodiments according to the disclosure, the controller 630 can be a central processing unit (CPU) configured to execute program instructions to perform various functions and processes described herein.

The interface 600 can optionally include other components, such as input and output devices, additional or signal processing circuitry, and the like. Accordingly, the interface 600 may be capable of performing other additional functions, such as executing application programs, and processing alternative communication protocols.

Figure 7:
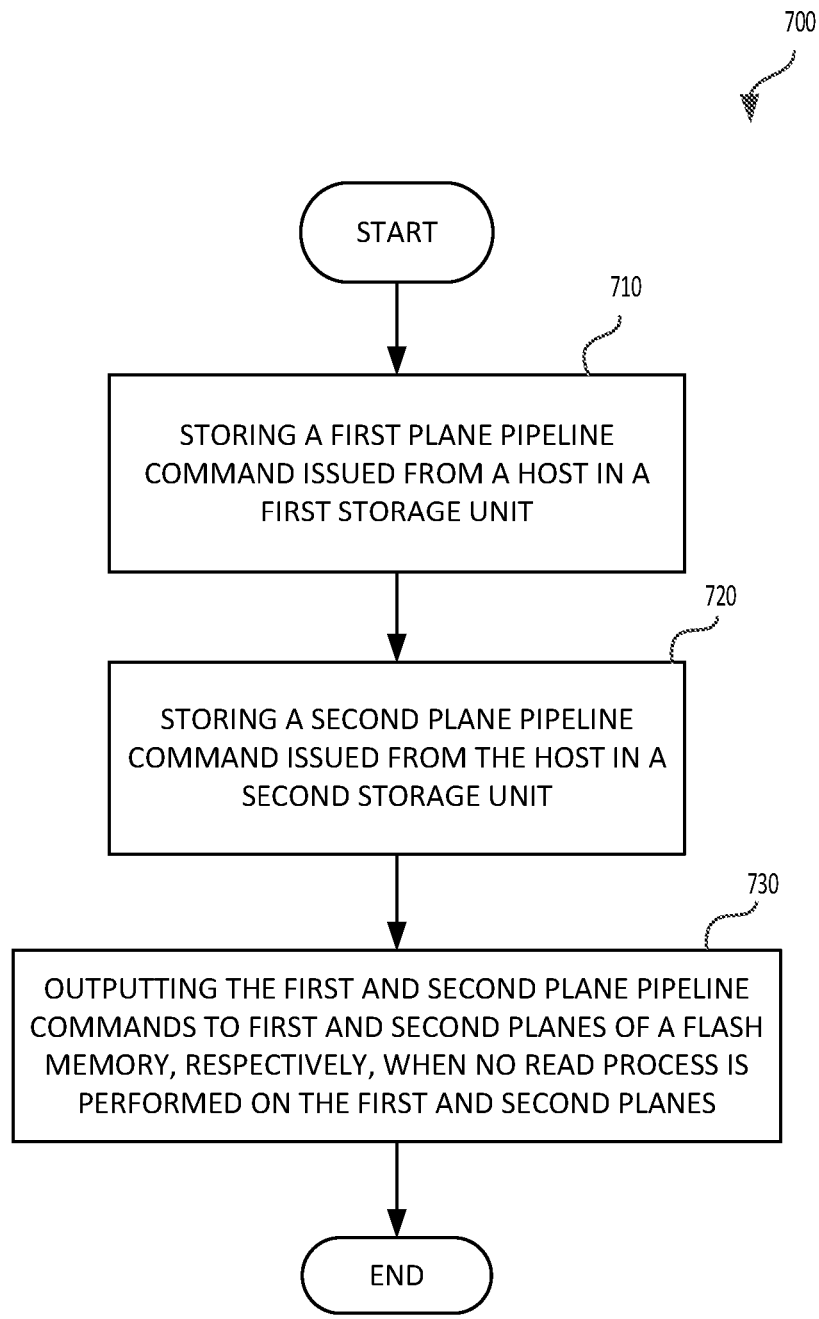
FIG. 7 shows a flow chart of an exemplary method according to some embodiments of the disclosure.

FIG. 7 shows a flow chart illustrating an exemplary method 700 according to some embodiments of the disclosure. The method 700 can output commands issued synchronously or asynchronously from the host 410 to the multi-plane flash memory 400 synchronously. In various embodiments, some of the steps of the method 700 shown can be performed concurrently or in a different order than shown, can be substituted by other method steps, or can be omitted. Additional method steps can also be performed as desired. Aspects of the method 700 can be implemented by an electronic device, such as the interface 600 illustrated in and described with respect to the preceding figures.

At step 710, the first storage unit 610 can receive and store a first plane pipeline command issued from the host 410. For example, the first plane pipeline command can include a first plane pipeline read command (e.g., add0_p0 "38h", add2_p0 "38h" and add4_p0 "38h") and a first plane pipeline read end command (e.g., addx_p0 "3Dh"). In some embodiments, the first storage unit 610 can store either the first plane pipeline read command or the first plane pipeline read end command at a time. In other embodiments, the first storage unit 610 can store only one of the first plane pipeline read command at a time.

At step 720, the second storage unit 620 can receive and store a second plane pipeline command issued from the host 410. For example, the second plane pipeline command can include a second plane pipeline read command (e.g., add1_p1 "38h", add3_p1 "38h" and add5_p1 "38h") and a second plane pipeline read end command (e.g., addx_p1 "3Dh"). In some embodiments, the second storage unit 620 can store either the second plane pipeline read command or the second plane pipeline read end command at a time. In other embodiments, the second storage unit 610 can store only one of the second plane pipeline read command at a time. In the example shown in FIG. 7, step 710 is followed by step 720. In some embodiments, step 710 can follow step 720, i.e., storing a first plane pipeline command following storing a second plane pipeline command. In other embodiments, step 710 and step 720 can be executed synchronously, i.e., synchronously storing first and second plane pipeline commands in first and second memories, respectively.

At step 730, the first plane pipeline command stored in the first storage unit 610 and the second plane pipeline command stored in the second storage unit 620 can be output to and performed on the first plane 310 (i.e., the plane_0 310) and the second plane 311 (i.e., the plane_1 311) of the flash memory 400 synchronously when no read process is performed on the first plane 310 and the second plane 311 of the flash memory 400. For example, the first and second plane pipeline commands can be output to and performed on the first plane 310 and the second plane 311 synchronously, no matter whether they are issued by the host 410 and received in the first storage unit 610 and the second storage unit 620 synchronously or asynchronously. In some embodiments, the first plane pipeline command can be stored in the first storage unit 610 after the first storage unit 610 is empty. In other embodiments, the second plane pipeline command can be stored in the second storage unit 620 after the second storage unit 620 is empty.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An interface between a host and a multi-plane flash memory, comprising:
   a first storage unit configured to receive and store a first plane pipeline command issued from the host, and output the first plane pipeline command to a first plane of the flash memory;
   a second storage unit configured to receive and store a second plane pipeline command issued from the host, and output the second plane pipeline command to a second plane of the flash memory; and
   a controller electrically connected to the first storage unit and the second storage unit, and configured to output the first plane pipeline command to the first plane and the second plane pipeline command to the second plane synchronously only when no read process is performed on any one of the first plane and the second plane of the flash memory, the first plane pipeline command and the second plane pipeline command being stored in the first storage unit and the second storage unit, respectively, so that the first plane of the flash memory performs a first operation corresponding to the first plane pipeline command and the second plane of the flash memory performs a second operation corresponding to the second plane pipeline command synchronously in response to a signal that indicates data stored in the first plane and the second plane have been cached into a first cache and a second cache, respectively, and the first cache and the second cache are ready to be accessed by the host,
   wherein the first plane pipeline command is distinct from the second plane pipeline command.

2. The interface of claim 1, wherein the first plane pipeline command includes a first plane pipeline read command and a first plane pipeline read end command.

3. The interface of claim 2, wherein the first storage unit is configured to store either the first plane pipeline read command or the first plane pipeline read end command at a time.

4. The interface of claim 1, wherein the controller includes a first switch having one end electrically connected to the first storage unit and the other end electrically connected to an interface between a host and a multi-plane flash memory for receiving the first plane pipeline command and being close after the first storage unit is empty.

5. The interface of claim 1, wherein the first storage unit is a queue.

6. The interface of claim 1, wherein the flash memory is a NAND flash memory.

7. The interface of claim 1, wherein the flash memory performs read processes on the first plane and the second plane synchronously.

8. The interface of claim 1, wherein the host issues the first plane pipeline command and the second plane pipeline command asynchronously.

9. The interface of claim 1, wherein the first storage unit and the second storage unit constitute a single memory.

10. A method for outputting commands issued from a host to a multi-plane flash memory, comprising:
    storing a first plane pipeline command and a second plane pipeline command that are issued from the host in a first storage unit and a second storage unit, respectively; and
    outputting the first plane pipeline command to a first plane of the flash memory and the second plane pipeline command to a second plane of the flash memory synchronously only when no read process is performed on any one of the first plane and the second plane of the flash memory, so that the first plane of the flash memory performs a first operation corresponding to the first plane pipeline command and the second plane of the flash memory performs a second operation corresponding to the second plane pipeline command synchronously in response to a signal that indicates data stored in the first plane and the second plane have been cached into a first cache and a second cache, respectively, and the first cache and the second cache are ready to be accessed by the host,
    wherein the first plane pipeline command is distinct from the second plane pipeline command.

11. The method of claim 10, wherein the first plane pipeline command includes a first plane pipeline read command and a first plane pipeline read end command.

12. The method of claim 11, wherein the first storage unit is configured to store either the first plane pipeline read command or the first plane pipeline read end command at a time.

13. The method of claim 10, wherein the first plane pipeline command is stored in the first storage unit after the first storage unit is empty.

14. The method of claim 10, wherein the first storage unit is a queue.

15. The method of claim 10, wherein the flash memory is a NAND flash memory.

16. The method of claim 10, wherein the flash memory performs read processes on the first plane and the second plane synchronously.

17. The method of claim 10, wherein the host issues the first plane pipeline command and the second plane pipeline command asynchronously.

18. The method of claim 10, wherein the first storage unit and the second storage unit constitute a single memory.

19. The method interface of claim 1, wherein the first plane of the flash memory performing the first operation corresponding to the first plane pipeline command and the second plane of the flash memory performing the second operation corresponding to the second plane pipeline command start at a same time.

20. The method of claim 10, wherein the first plane of the flash memory performing the first operation corresponding to the first plane pipeline command and the second plane of the flash memory performing the second operation corresponding to the second plane pipeline command start at a same time.

* * * * *